(12) United States Patent
Lumens et al.

(10) Patent No.: US 9,759,824 B2
(45) Date of Patent: Sep. 12, 2017

(54) SEISMIC MONITORING

(71) Applicant: OPTASENSE HOLDINGS LIMITED, Farnborough, Hampshire (GB)

(72) Inventors: Paul Gerard Edmond Lumens, The Hague (NL); Samantha Grandi, The Hague (NL)

(73) Assignee: Optasense Holdings Limited (GB)

( * ) Notice: Subject to any disclaimer, the term of this patent is extended or adjusted under 35 U.S.C. 154(b) by 295 days.

(21) Appl. No.: 14/367,488

(22) PCT Filed: Dec. 19, 2012

(86) PCT No.: PCT/GB2012/053188
§ 371 (c)(1),
(2) Date: Jun. 20, 2014

(87) PCT Pub. No.: WO2013/093460
PCT Pub. Date: Jun. 27, 2013

(65) Prior Publication Data
US 2014/0334253 A1    Nov. 13, 2014

(30) Foreign Application Priority Data
Dec. 23, 2011 (GB) .................................. 1122229.6

(51) Int. Cl.
*G01H 9/00* (2006.01)
*G01V 1/18* (2006.01)
(Continued)

(52) U.S. Cl.
CPC .............. *G01V 1/181* (2013.01); *G01V 1/226* (2013.01); *G01V 1/288* (2013.01); *G01H 9/004* (2013.01);
(Continued)

(58) Field of Classification Search
CPC .......... G01H 9/004; G01H 9/00; G01V 1/288; G01V 8/02; G01V 8/16; G01V 8/24
(Continued)

(56) References Cited

U.S. PATENT DOCUMENTS 6,305,227 B1 * 10/2001 Wu ..................... E21B 47/123
                                                      73/705
6,601,671 B1 *  8/2003 Zhao ........................ G01V 1/16
                                                     181/108
(Continued)

FOREIGN PATENT DOCUMENTS

GB            2406376            3/2005
WO    WO 2008/125916            10/2008
(Continued)

*Primary Examiner* — Ian J Lobo
(74) *Attorney, Agent, or Firm* — McDonnell Boehnen Hulbert & Berghoff LLP

(57) ABSTRACT

The application describes methods and apparatus for seismic monitoring using fiber optic distributed acoustic sensing (DAS). The method involves interrogating a first optical fiber (102) deployed in an area of interest to provide a distributed acoustic sensor comprising a plurality of longitudinal sensing portions of fiber and also monitoring at least one geophone (107) deployed in the area of interest. The signal from the at least one geophone is analyzed to detect an event of interest (105). If an event of interest is detected the data from the distributed acoustic sensor acquired during said event of interest is recorded. The geophone may be co-located with part of the sensing fiber and in some embodiments may be integrated (307) with the sensing fiber.

24 Claims, 2 Drawing Sheets

(51) Int. Cl.
*G01V 1/28* (2006.01)
*G01V 1/22* (2006.01)
*G01V 1/44* (2006.01)

(52) U.S. Cl.
CPC .......... *G01V 1/44* (2013.01); *G01V 2210/123* (2013.01); *G01V 2210/1429* (2013.01)

(58) Field of Classification Search
USPC ......................................................... 367/149
See application file for complete search history.

(56) References Cited

U.S. PATENT DOCUMENTS

| | | | |
|---|---|---|---|
| 7,122,783 B1 * | 10/2006 | Pastore, Jr. .............. | G01V 1/00 250/227.14 |
| 2010/0200744 A1 | 8/2010 | Pearce et al. | |
| 2011/0069302 A1 | 3/2011 | Hill et al. | |

FOREIGN PATENT DOCUMENTS

| WO | WO 2011/058313 | 5/2011 |
|---|---|---|
| WO | WO 2011/162868 | 12/2011 |

\* cited by examiner

SEISMIC MONITORING

FIELD OF THE INVENTION

This invention relates to seismic monitoring, and especially to long term seismic monitoring, using distributed fibre optic sensors, in particular distributed acoustic sensors.

BACKGROUND OF THE INVENTION

Seismic geophysical monitoring and surveying is used in a variety of applications. For example in the oil and gas sector seismic surveys may be conducted at numerous different stages of well construction and operation. In particular, once well construction has been completed and the wells are operational there may be a desire to perform long term seismic monitoring to monitor for any microseismic events so as to highlight any significant changes in the condition of the wells and/or the reservoir over time.

Seismic monitoring may also be used for assessing reservoirs for the storage of hazardous or unwanted materials, for example in carbon dioxide sequestrations schemes. In these applications there may again be a desire to undertake long term seismic monitoring, for example to listen for microseismic events following the injections, to monitor the condition of the site over time.

Long term seismic monitoring is conventionally performed by locating an array of seismometers in an area to be monitored. Typically an array of geophones is used as the sensing array. The geophones may be arranged over the surface of the area to be monitored in a desired pattern and/or a string of geophones may be deployed down a well bore.

Recently is has been proposed to use fibre optic distributed acoustic sensors as the sensor array in seismic monitoring. Distributed acoustic sensing (DAS) is a known type of sensing where an optical fibre is deployed as a sensing fibre and interrogated with electromagnetic radiation. Radiation which is backscattered from within the optical fibre is detected and analysed to reveal information about acoustic stimuli acting on the optical fibre in different longitudinal sections of the sensing fibre, i.e. channels. Thus the DAS sensor effectively acts as a linear sensing array of sensing portions of optical fibre. The length of the sensing portions of fibre is determined by the characteristics of the interrogating radiation and the processing applied to the backscatter signals but typically sensing portions of the order of 10 m or so may be used in some applications and smaller sensing portions for more precise applications. Note as used herein the term acoustic shall mean any type of pressure wave or disturbance that may result in a change of strain on an optical fibre and for the avoidance of doubt the term acoustic be taken to include seismic waves.

DAS has several potential advantages compared to the use of geophone arrays. Firstly geophone arrays are expensive. Thus, for active surveys, where the area under investigation is stimulated using a seismic source and the response to the seismic stimulus recorded, a geophone array may be deployed just for the survey and recovered afterwards for use at another location. For long term monitoring of an area however clearly the sensor will remain deployed for the duration of the monitoring. The expense of geophone arrays means that the number of individual sensing elements in a geophone array which is deployed for long term monitoring is typically limited.

DAS however uses a relatively inexpensive optical fibre as the sensing medium. The optical fibre can be deployed in the area to be surveyed, for example by being buried in a desired arrangement to protect the fibre from the environment, and left in situ for a long period of time. With DAS a fibre of length of up to about 40 km can be used to provide surface seismic monitoring with 10 m long sensing portions to provide 4000 individual sensing portions. This provides significantly more data channels than is usual with a conventional geophone array, and at very low cost. DAS can also allow the whole of a deep well, say 4 km or more, to be monitored, possibly with much shorter sensing portions. With a typical geophone array there may be a limit to the number of geophones that are used and thus the geophone array may only be able to monitor part of a deep-well site.

For current DAS sensors the instantaneous output from any individual sensing portion of fibre may not offer the same level of sensitivity as a conventional geophone. However various processing techniques such as combining the results from several independent sensing channels can be used to improve the signal to noise ratio of the DAS sensor such that DAS can usefully be employed in seismic monitoring.

DAS therefore offers several advantages for seismic monitoring and has usefully been employed in seismic surveying. However the fact that DAS allows a significant increase in the number of sensing channels available, coupled with the fact that DAS sensor typically have a data output rate which is greater than for conventional geophones, raises some potential problems with data storage and processing.

For long term microseismic monitoring the sensor array may be acquiring data constantly for relatively long periods of time. Usually the output data from the sensor array is stored for later processing.

For seismic monitoring using a DAS sensor the significant increase in number of sensing channels, coupled with the increased data rates, will result in significantly more data being produced than with a conventional geophone array. Handling and storing this data is not a trivial task, especially as the area being monitored may often be in a remote and relatively hostile environment.

Some conventional geophone acquisition systems can be equipped with online event detection and triggering to store detected events only. In other words the data output from the geophone array may be buffered and initially processed to determine whether there are any events of interest. If not the data will not be stored and will be gradually replaced in the buffer by newer data. If however an event of interest is detected the buffered data may be stored, with data being stored until the event of interest ends. In this way only the data relevant to events of interest is stored, thus reducing data storage requirements.

With geophone arrays the relatively low data rates and relatively high sensitivity of the individual geophones means that event detection is relatively straightforward. However with DAS sensors the higher data rate and relatively lower sensitivity of an individual sensing portion of fibre means that it is not straightforward to detect when an event of interest is occurring. Processing the data from several different channels of the DAS sensor in order to detect an event of interest would involve significant computational overhead, and in order to usefully be able to make a decision whether to store or discard the buffered data the processing must operate effectively in real time. This would involve deploying significant computational resources in a field based interrogator unit with a significant impact on cost and complexity of the unit.

It would therefore be advantageous to provide methods and apparatus for seismic monitoring using distributed fibre optic sensing which mitigate at least some of the above mentioned disadvantageous.

SUMMARY OF THE INVENTION

Thus according to a first aspect of the invention there is provided a method of seismic monitoring comprising: interrogating a first optical fibre deployed in an area of interest to provide a distributed acoustic sensor comprising a plurality of longitudinal sensing portions of fibre; monitoring at least one geophone deployed in the area of interest; analysing the signal from said at least one geophone to detect an event of interest; and recording data from said distributed acoustic sensor acquired during said event of interest.

The method of the present invention therefore uses DAS to monitor an area of interest but also uses at least one geophone which is also deployed in the area of interest, for example along the length of the first optical fibre, i.e. the sensing fibre. The output from the geophone can be analysed to detect a seismic event of interest which then triggers recording of the relevant data from the DAS sensor. In this way only the relevant data from the DAS sensor is recorded but the event detection is based on the relatively sensitive and low data rate signal from a geophone. This avoids the need for processing of the data from the DAS sensor in real time, with the associated need for significant computing resource.

As the signal from the at least one geophone need only be used to identify an event of interest a relatively simple, and hence relatively low cost, geophone may be used. For instance the geophone may a single component geophone, although multi-component geophones may be used if desired. Any type of geophone could be used to provide event detection and the at least one geophone may comprise an electric geophone but in some embodiments the geophone may comprise a fibre optic geophone such as a Fibre Bragg Grating geophone. In some embodiments the geophone may be any assembly that detects incident mechanical disturbance and which is more sensitive than the channels of the DAS sensor. For example the geophone could be implemented as part of the sensing cable which has been adapted to be more sensitive, for instance by the use of solid-on-solid coupling, a fibre spool and/or an inertial member of the like.

The geophone may be a multi-component geophone, i.e. able to detect/discriminate incident waves which arrive from different directions. The one or more geophones may be arranged to not only provide triggering for the DAS sensors but may also provide certain measurements that the DAS sensors may not be able to readily provide. For example one array of geophones may be arranged to acquire a series of measurements and one or more DAS sensors may be arranged in other locations in the area of interest to provide wider coverage.

The geophones may however be relatively simple single component geophones which are not able to separately determine a direction of incidence. It will be appreciated that single component geophones may exhibit a preferential response to stimuli which are incident from a certain direction. The skilled person will appreciate that the sensing fibre of the DAS sensor will also tend to be more sensitive to signals propagating axially, i.e. longitudinally, along the fibre (as this may result in the greatest path length variation within the fibre) than to transverse or broadside signals. The geophones may therefore be arranged such that a direction of maximum sensitivity of the geophone is substantially orthogonal to that of the sensing fibre (or alternatively that the directions of minimum sensitivity of the geophone and sensing fibre are orthogonal). Any signals which are incident from a direction where the sensing fibre is maximally sensitive may be detected by looking at the returns from the DAS sensor without requiring significant processing, i.e. in that instance the DAS sensor could self trigger. However signals received from the direction of minimum sensitivity of the DAS sensor would be clearly detected by the geophone which could trigger the storage of data from the DAS sensor.

The (or each) geophone is preferably deployed in the same location as part of the sensing first optical fibre. However this does not necessarily have to be the case. One or more geophones could be deployed in one location in the area of interest, for instance in a first borehole, and at least one DAS sensor arranged with sensing fibre in a different location, for instance in another borehole. Detection of an event of interest by the one or more geophones could be used to trigger data storage for the time period corresponding to the event of interest for the at least one DAS sensor.

When using one or more fibre optic geophones the (or each) geophone could be linked to a geophone interrogator by a second fibre optical fibre. Thus the (or each) geophone could be formed as part of, or connected to, the second optical fibre which connects the geophone(s) to a geophone interrogator unit. The geophone interrogator unit may be integrated with the DAS interrogator unit and optionally may share components such as an optical source and detector. Alternatively the geophone interrogator may form a separate unit to the DAS interrogator. The second optical fibre may be deployed along the same path as the first optical fibre.

In one embodiment however the at least one geophone is integrated into the first optical fibre. In other words the at least one geophone forms part of, or is connected to, the first optical fibre. In this embodiment the first optical fibre serves as both the sensing optical fibre for the DAS sensor and the means of interrogating the at least one geophone. This has the advantage that only one sensing optical fibre is needed and only the first optical fibre is deployed in the area of interest. A single interrogator unit may then be used to interrogate the first optical fibre to provide the DAS sensor and also to interrogate the geophone. At least one geophone may therefore be located between two sections of the first optical fibre which are interrogated to provide distributed acoustic sensing.

The fibre optic geophone may be interrogated using the same interrogating radiation used for DAS. As the skilled person will appreciate DAS relies on launching interrogating radiation into the sensing fibre and analysing the backscatter radiation. The backscatter signal is typically analysed in a plurality of analysis bins corresponding to different times after launch of the interrogating radiation in order to provide the longitudinal sensing portions of fibre. As the position of the (or each) geophone in the optical fibre will be known the expected time of return for the reflected signal from the geophone will be known. Thus the return signal due to a geophone can be isolated from the returns from the intrinsic scattering sites within the optical fibre that provide the distributed acoustic sensing. In effect a small portion of optical fibre corresponding to the location of the geophone may not form part of the distributed acoustic sensor. Alternatively the fibre optic geophone may be interrogated using a different wavelength using wavelength division multiplexing.

It will be noted that reflection signal from the geophone will typically be much more intense than the relatively weak backscatter signal generated from the rest of the optical fibre. Thus the detector used to detect the backscatter signal should be sensitive enough to provide reliable performance for DAS but also be able to correctly detect the measurement signal from the or each geophone. In one embodiment the method may involve applying attenuation to the backscatter signal at the time corresponding to signal returns from the geophone—thus a sensitive detector may be used and the intense signal from the geophone attenuated at the correct time. Alternatively separate detectors may be used at different times to detect the different signal returns or the sensitivity of the detector may be varied at an appropriate time.

As mentioned the detection of an event of interest is used to trigger recording of the data from the plurality of sensing portions of the distributed acoustic sensor. Data from each of the longitudinal sensing portions of optical fibre may therefore initially be buffered. For example a certain duration of data may be buffered. The size of the buffer should be large enough to record data for the time required to process the output of the at least one geophone. The buffer may also be large enough to allow for different times of arrival of an incident seismic wave at a sensing portion of fibre of the DAS sensor and the geophone. For example if a first sensing portion of the DAS sensor is relatively remote from a geophone then an incident seismic wave may arrive at the first sensing portion at a first time and may arrive at the geophone at a second, different, time, which may be before or after the first time depending on the direction of arrival. Ideally the data corresponding to the arrival of the incident seismic wave at all affected sensing portions of fibre is recorded. Thus the buffer may be large enough to allow time for the seismic signal to travel to the geophone and for the data processing. Where the geophone that is used to trigger data storage is located remotely to the sensing fibre the size of buffer, and time window of data stored, may also be sufficient to allow for different times of arrival of the signal of interest at the geophone and the sensing fibre.

In the event that no seismic event of interest is detected the buffer may be continually updated with new data with the oldest data in the buffer effectively being discarded. However when a seismic event of interest is detected the contents of the buffer may be written into a permanent, i.e. non transient, data store. This may comprise outputting the data to some suitable data store. The output data from the DAS sensor may be stored for as long as the event of interest continues, plus possibly for a short time afterwards to allow for time of arrival differences (although the delay inherent in processing the geophone signal may provide sufficient time after the event) or the detection of an event may simply trigger storing of a certain amount of data. The contents of the buffer from before the event of interest that was detected by the geophone may also be stored. In some instances it may be wished to analyse the signals received before a significant seismic event may be of interest.

Detection of an event of interest may involve processing the signal from the at least one geophone to detect a seismic signal above a certain threshold intensity and/or having a particular characteristic. The processing of geophone signals to detect seismic events of interest will be well known to one skilled in the art. Where more than one geophone is used the method may comprise processing the signals from each geophone independently and/or the signals from more than one geophone could be analysed together to detect events of interest.

Where there is only a single geophone the detection of an event may cause the storage of data from all of the channels of the DAS sensor. Where two or more geophones are used independently to detect events of interest then in one embodiment, only the data from those sensing portions of interest in the vicinity of a geophone which detects an event of interest may be recorded. For example consider that the first optical fibre is relatively long and is arranged in generally linear arrangement with first and second geophones deployed at different positions along the fibre length so as to effectively divide the first optical fibre into first, second and third sections. If the first geophone detects an event of interest but the second geophone does not this may indicate that the seismic signal has been strongly attenuated by the time it reaches the second geophone. Hence it may be assumed that the signal would also be strongly attenuated for the sensing portions of the DAS sensor in the third section of fibre, i.e. that part of the sensing fibre which is even more remote from the first geophone. Thus data from the sensing portions of fibre in the first and second sections may be recorded but data from the third section discarded.

It will be appreciated however that for some signals the seismic signal may be attenuated at the position of the geophone but not at other positions. Also even if the signal has attenuated such that reliable event detection is not possible by the second geophone, later signal processing on the data from the third section of fibre (if recorded), which can make use of the knowledge that an event has occurred and information from the other sensing portions, may provide useful information from the sensing portions in third section of fibre. Thus in some embodiments detection of an event of interest from any geophone may trigger recording of the data from all sensing portions, i.e. channels, of the DAS sensor.

After recording the data could be processed further. For instance some signal processing could be performed to reduce further the long term storage requirements. Additionally or alternatively the data from the DAS sensor could be processed to perform signal processing to provide event detection and/or categorisation based on the DAS data. It should be noted that the method of the present invention allows a means of determining those parts of the DAS data which are of most interest for further analysis. Thus even when storage requirements are not particularly at issue the method of the present invention can reduce the overall computational burden of processing data from a DAS sensor to analyse events of interest as compared to processing the DAS data itself in order to detect such events. The method may therefore enable faster analysis of DAS data without requiring significant computational resources.

In general therefore the present invention relates to a method of handling data from a distributed acoustic sensor comprising using data from one or more geophones to identify relevant data from a distributed acoustic sensing for further analysis wherein the one or more geophones are co-located with an optical fibre used for sensing in the distributed acoustic sensor. The method according to this aspect of the invention offers all of the same advantages and can be used in all of the same embodiments as in the first aspect of the invention.

In another aspect of the invention there is provided a distributed acoustic sensor apparatus comprising: a fibre optic interrogator configured to, in use, interrogate a first optical fibre with interrogating radiation and analyse radiation backscattered from within said first optical fibre to determine a measurement signal for a plurality of discrete longitudinal sensing portions of said first optical fibre; and a processor responsive to a signal from at least one geophone wherein the processor is configured to analyse the signal from said at least one geophone to detect an event of interest and, when an event of interest is detected, to output data corresponding to said measurement signals for said plurality of discrete longitudinal sensing portions to a data store.

The apparatus according to this aspect of the invention offers all of the same advantages and can be used in all of the embodiments as discussed above in relation to the method. In particular the at least one geophone may comprise a fibre optic geophone such as a Fibre Bragg Grating geophone.

In one embodiment the apparatus may be configured to, in use, interrogate a second optical fibre which is linked to fibre optic geophone. The fibre optic interrogator may comprise an optical source configured to interrogate both said first and second optical fibres and may comprise a detector configured to detect radiation which is backscattered or reflected from both said first and second optic fibres.

In another embodiment the at least one geophone is integrated into the first optical fibre and thus the fibre optic interrogator may comprise an optical source configured to interrogate said first optical fibre to provide distributed acoustic sensing and also interrogate said at least one geophone. The fibre optic interrogator may also comprise a detector configured to detect radiation which is backscattered from said first optic fibre and reflected from said fibre optic geophone.

The apparatus may therefore comprise a first optical fibre coupled to said fibre optic interrogator wherein said first optical fibre comprises at least one geophone.

The apparatus may comprise a data buffer for buffering data corresponding to said measurement signals for said plurality of discrete longitudinal sensing portions. The processor may be arranged such when a seismic event of interest is detected the contents of the buffer are output into a permanent data store.

DESCRIPTION OF THE DRAWINGS

The invention will now be described by way of example only with reference to the following drawings, of which.

DESCRIPTION OF THE INVENTION

Figure 1:
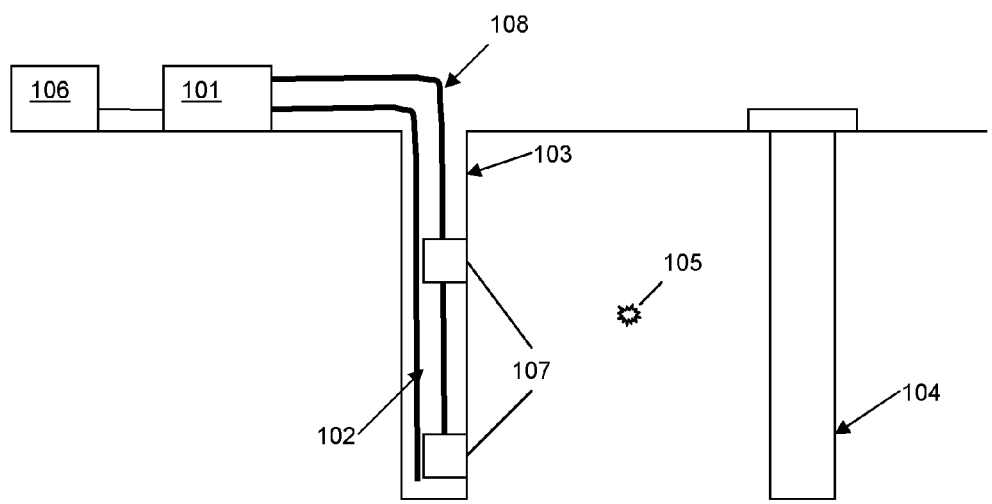
FIG. 1 illustrates a fibre optic distributed acoustic sensor used for seismic monitoring according to an embodiment of the invention.

FIG. 1 illustrates a first embodiment of a seismic monitoring arrangement according to an embodiment of the present invention.

An interrogator unit 101 is removably connected to a first optical sensing fibre 102 to provide a distributed acoustic sensor. In this example the sensing fibre 102 is deployed to run the length of an observation wellbore 103 to provide long term monitoring of a reservoir in the vicinity of operational well 104, which may be a production well or an injection well. Other arrangements are possible however and the fibre could additionally or alternatively be at least partly buried near the surface of the area to be monitored. The sensing fibre 102 can be many kilometers in length and may, in this example, be at least as long as the depth of the observation wellbore which may be at least 1.5 km long. In this embodiment the sensing fibre may be a standard, unmodified single mode optic fibre such as is routinely used in telecommunications applications. The ability to use standard optical fibre to provide sensing means that low cost readily available fibre may be used. However in some embodiments the fibre may comprise a fibre which has been fabricated to be especially sensitive to incident vibrations.

In operation the interrogator 101 launches interrogating electromagnetic radiation, which may for example comprise a series of optical pulses having a selected frequency pattern, into the sensing fibre. The optical pulses may have a frequency pattern as described in GB patent publication GB 2,442,745, the contents of which are hereby incorporated by reference thereto. Note that as used herein the term "optical" is not restricted to the visible spectrum and optical radiation includes infrared radiation and ultraviolet radiation. Backscattering results in some fraction of the light input into the fibre being reflected back to the interrogator, where it is detected to provide an output signal which is representative of acoustic disturbances in the vicinity of the fibre. In one embodiment the detector is arranged to detect radiation which has been Rayleigh backscattered within said fibre, but other types of distributed acoustic sensor using other types of backscatter are known.

Figure 2:
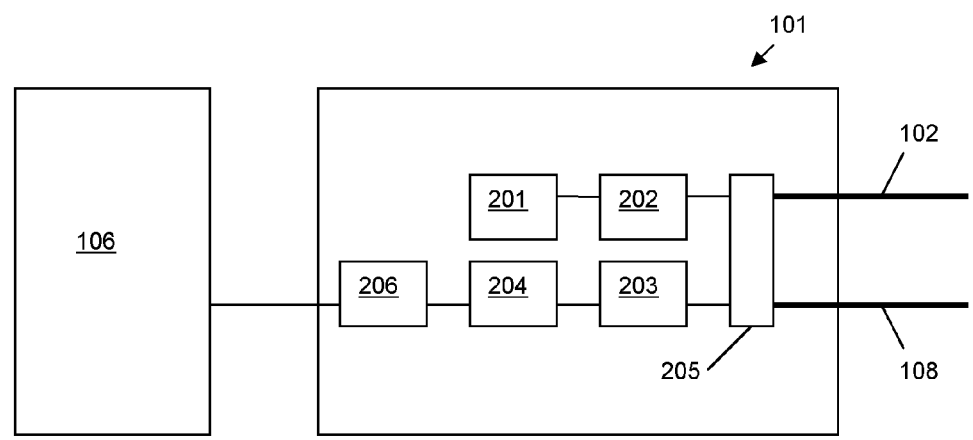
FIG. 2 illustrates the interrogator unit of the distributed acoustic sensor in more detail.

Referring to FIG. 2 the interrogator therefore comprises at least one laser 201 and at least one optical modulator 202 for repeatedly producing at least two optical pulses which are separated by a known optical frequency difference. The interrogator also comprises at least one photodetector 203 arranged to detect radiation which is Rayleigh backscattered from the intrinsic scattering sites within the fibre 102.

The signal from the photodetector 203 is sampled and processed by processor 204. The processor conveniently demodulates the returned signal, for example based on the frequency difference between the optical pulses. The phase of the backscattered light from various sections of the optical fibre can therefore be monitored. Any changes in the effective path length from a given section of fibre, such as would be due to incident pressure waves causing strain on the fibre, can therefore be detected.

The form of the optical input and the method of detection allow a single continuous fibre to be spatially resolved into a plurality of discrete longitudinal sensing portions. That is, the acoustic signal sensed at one sensing portion can be provided substantially independently of the sensed signal at an adjacent portion. Such a sensor may be seen as a fully distributed or intrinsic sensor, as it uses the intrinsic scattering processed inherent in an optical fibre and thus distributes the sensing function throughout the whole of the optical fibre. The spatial resolution of the sensing portions of optical fibre may, for example, be approximately 10 m or less, which for a continuous length of fibre deployed down the entire length of a 4 km well 103 say provides at least 400 independent acoustic channels or so deployed along the entire length of the well which can provide effectively simultaneous monitoring of the entire length of the wellbore.

Referring back to FIG. 1 then the interrogator 101 can therefore provide long term monitoring of any seismic events 105 occurring in the vicinity of the reservoir and thus can provide long term monitoring of any changes occurring over time. A seismic event occurring in the area being monitored will create seismic waves which will propagate through the surrounding rock and will be incident on the sensing fibre 102. The seismic signals will cause path length changes in the various sections of optical fibre which can be detectable as phase modulations affecting the various sensing portions.

Use of a DAS sensor provides an advantage over the conventional geophone array as significantly more data channels can be achieved for relatively low cost. However the number of additional data channels, together with the relatively high data rates for DAS mean that significant amounts of date could be produced by the interrogator unit 101. Typically the data from long term monitoring is stored in a data store 106 for later analysis and thus the use of DAS can potential means that a large amount of data must be stored, which may not be feasible, especially in remote and relatively hostile environments.

Thus according to one embodiment of the present invention the interrogator 101 is also in communication with geophones 107. In the example shown in FIG. 1 two geophones 107 are deployed along the path of the sensing fibre 102. The geophones 107 also monitor for any incident seismic signals. The signals from the geophones are analysed, conveniently by the processor 204 of the interrogator 101, to detect any seismic events 105 of interest. The skilled person will be aware of various ways in which the signals from geophones 107 may be analysed to detect seismic events 105 of interest. If no seismic events of interest are detected from the geophone signals the data corresponding to the plurality of sensing channels of the sensing fibre 102 need not be retained. Only when a seismic event of interest is detected is the data stored. The geophones 107 are used to detect the events of interest as the individual geophones are typically more sensitive than an individual sensing portion of the DAS sensor. Thus an event of interest can be readily detected by a relatively simple analysis of the geophone signal whereas detecting the same event of interest using purely the data from the DAS sensor may involve combining the results from several sensing portions of fibre together and may involve significant processing.

The geophones 107 may be any conventional geophone but as the geophone signal may be used only for detection of events of interest a relatively simple geophone may be used and a single component geophone may be acceptable. Thus the geophones may be relatively simple and hence inexpensive geophones. In the example shown in FIG. 1 the geophones 107 are fibre optic geophones and are interrogated by interrogator 101 via a second optical fibre 108. As the skilled person will be aware various fibre optic geophones, such as Fibre Bragg Grating based geophones are known. Such geophones are interrogated with radiation and reflect/backscatter radiation with a characteristic, such as a frequency shift, that depends on the strain applied to the geophone.

Referring to FIG. 2 various components of the interrogator 101 may therefore be shared to provide the DAS sensor using optical fibre 102 and signals from the geophones 107 using optical fibre 108. Thus the laser 201 and modulator 202 may generate interrogating radiation for DAS sensing fibre 102 and also interrogating radiation for the optical fibre 108 connected to geophone 107. Likewise detector 203 may detect radiation backscattered/reflected from both optical fibres. The different interrogating radiation may be time division or wavelength division multiplexed by multiplexer/ demultiplexer 205. The processor 204 may then not only derive the measurement signals for the DAS sensor but may also process the signals from the geophones to detect an seismic event of interest.

When a seismic event of interest is detected the data corresponding to the multiple sensing portions of the DAS sensor may be output to data store 106 for storage and/or for further analysis. However, as the processing of the signals from the geophones 107 may take some time and also as the time of arrival of the seismic wave at a geophone 107 may be after the time of arrival of the same seismic wave at a sensing portion of sensing fibre 102 the DAS data output from the processor 204 may be temporarily stored in data buffer 206. The size of data buffer 206 may be large enough to store sufficient data from all the channels to allow for time for processing and worst case expected time of arrival difference, i.e. if in the worst case the seismic signal could arrive at a sensing portion a time x before arriving at a geophone and the processing time for the geophone signals takes a time y the buffer stores data for a period equal to at least x+y.

The buffer may be a shift buffer type arrangement such that as new data enters the buffer the oldest data exits the buffer. In the normal course of events, if no seismic events of interest have been detected, data is output from the processor to the buffer but no data is output from the buffer. Thus over time the older data is effectively discarded. If however a seismic event of interest is detected the output from the buffer is output to the data store 106. A predetermined amount of data, for instance corresponding to a set duration of data, may be stored or the writing to the data store may continue for as long as an event of interest is detected and a short time thereafter.

The embodiment described with reference to FIG. 1 uses a separate geophone array 107, 108 and DAS sensing fibre 102. In another embodiment, illustrated in FIG. 3 a single optical fibre may be used to provide both the DAS sensing fibre and one or more geophones.

U.S. Pat. No. 7,965,909, the contents of which is hereby incorporated by way of reference, describes a fibre optic surveillance system comprises a series of point fibre optic sensors such as geophones with successive point sensors that are linked by distributed fibre optic sensors. This embodiment of the present invention uses a similar arrangement to provide a DAS sensor with an integrated fibre optic geophone.

Figure 3:
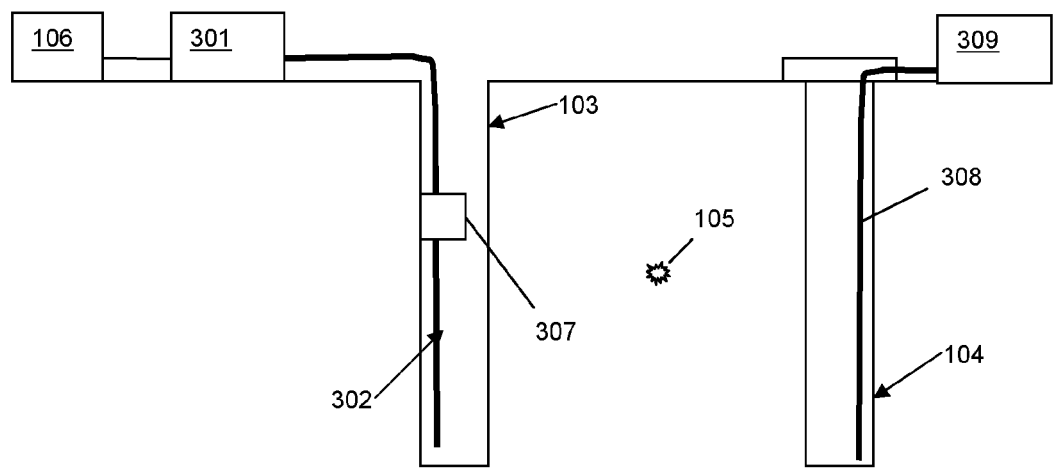
FIG. 3 illustrates a fibre optic distributed acoustic sensor with an integrated fibre optic geophone according to another embodiment of the invention.

FIG. 3 therefore shows a similar arrangement to FIG. 1 wherein corresponding elements are given corresponding reference numerals. In this arrangement however an interrogator 301 is connected to a single optical fibre 302 which include an integrated fibre optic geophone 307. This does mean that conventional telecoms fibre can no longer by used and an optical fibre with a fibre Bragg grating is required, however only one optical fibre needs to be deployed in the area of interest and the geophone will inevitably be co-located with the DAS sensing fibre. The interrogator 301 may have effectively the same components and may operate in the same way as that described above in relation to FIG. 2.

As mentioned above, as the geophones may simply be used to trigger data storage and/or analysis of data from the DAS sensor, relatively simple geophones can be used. Thus the geophones could be implemented as parts of the sensing fibre which exhibit enhanced sensitivity. The skilled person will be aware of a number of ways in which the sensitivity of the sensing fibre can be improved in certain areas, for instance by spooling the fibre, using solid-on-solid coupling and/or inertial members. Inclusion of such portions of enhanced sensitivity increase the cost of the sensing fibre but only relatively few such enhanced sensitivity portions are required and the fibre may still be cheaper than a geophone array.

It will be noted of course that in some embodiments good quality geophones may be employed to acquire acoustic/seismic data with the DAS sensor providing additional information. For example one or more geophones may be arranged in a first location to acquire data and one more DAS sensors may be deployed in other areas to acquire signals. Provided that the geophones and DAS sensing fibre are in the same general location of interest the geophone can still be used to trigger data capture from the DAS sensor.

For example FIG. 3 illustrates that wellbore 104 may be provided with a sensing fibre 308 which is connected to an interrogator/controller 309. The geophone 307 (which could be a stand alone geophone not integrated with or located with sensing fibre 302) could be used to detect acoustic signals of interest. Detection of an event of interest could then be signalled to interrogator/controller 309 which then saves the current data in the buffer as described above. In this example the size of the buffer and the amount of data stored should be sufficient to cope for the maximum expected difference in arrival times of the acoustic/seismic signals at the different locations.

The invention claimed is:

1. A method of seismic monitoring comprising:
   interrogating a first optical fibre deployed in an area of interest to provide a distributed acoustic sensor comprising a plurality of longitudinal sensing portions of fibre;
   monitoring two or more geophones deployed in the area of interest;
   analysing the signal from said two or more geophones to independently detect an event of interest; and
   recording data from said distributed acoustic sensor acquired during said event of interest from only those sensing portions of fibre in the vicinity of a geophone which detects an event of interest.

2. A method as claimed in claim 1 wherein at least one geophone is deployed in the same location as part of the sensing fibre.

3. A method as claimed in claim 1 wherein the at least one of the two or more geophones comprises a single component geophone.

4. A method as claimed in claim 1 wherein the at least one of the two or more geophones comprises an electric geophone.

5. A method as claimed in claim 1 wherein the at least one of the two or more geophones comprises a fibre optic geophone.

6. A method as claimed in claim 5 comprising interrogating said at least one fibre optic geophone via a second fibre optical fibre.

7. A method as claimed in claim 6 wherein said second optical fibre is deployed along the same path as the first optical fibre.

8. A method as claimed in claim 1 wherein said at least one geophone is integrated into the first optical fibre.

9. A method as claimed in claim 8 wherein interrogating the first optical fibre to provide a distributed acoustic sensor also comprises interrogating the at least one geophone incorporated into the first optical fibre.

10. A method as claimed in claim 1 comprising initially buffering data from each of the longitudinal sensing portions of said first optical fibre.

11. A method as claimed in claim 10 wherein, when a seismic event of interest is detected the contents of the buffer is written into a permanent data store.

12. A method as claimed in claim 1 wherein detection of an event of interest comprises processing the signal from the at least one geophone to detect a seismic signal above a certain threshold intensity and/or having a particular characteristic.

13. A method as claimed in claim 1 further comprising processing said stored data to reduce data storage requirements and/or to provide event detection and/or categorisation.

14. A method as claimed in claim 1 wherein at least one geophone is arranged to provide measurements not provided by the distributed acoustic sensor.

15. A method as claimed in claim 1 in which interrogating the first optical fibre comprises interrogating the fibre with interrogating radiation and detecting radiation which is Rayleigh backscattered from the fibre.

16. A method of handling data from a distributed acoustic sensor comprising:
   co-locating one or more geophones with an optical fibre used for sensing in the distributed acoustic sensor; and
   independently using data from two or more geophones to identify relevant data from those sensing portions of a distributed acoustic sensing fibre in the vicinity of a geophone which detects an event of interest for further analysis.

17. A distributed acoustic sensor apparatus comprising:
   a fibre optic interrogator configured to, in use, interrogate a first optical fibre with interrogating radiation and analyse radiation backscattered from within said first optical fibre to determine a measurement signal for a plurality of discrete longitudinal sensing portions of said first optical fibre; and
   a processor responsive to a signal from two or more geophones wherein the processor is configured to analyse the signal from said two or more geophones to independently detect an event of interest and, when an event of interest is detected, to output data corresponding to said measurement signals for said plurality of discrete longitudinal sensing portions of the first optical fibre in the vicinity of a geophone which detects an event of interest to a data store.

18. An apparatus as claimed in claim 17 wherein at least one of the two or more geophones comprises a fibre optic geophone.

19. An apparatus as claimed in claim 18 wherein at least one fibre optic geophone comprises a Fibre Bragg Grating geophone.

20. An apparatus as claimed in claim 18 wherein the apparatus is configured to, in use, interrogate a second optical fibre which is linked to said fibre optic geophone.

21. An apparatus as claimed in claim 20 wherein the fibre optic interrogator comprises at least one of:
   (i) an optical source configured to interrogate both said first and second optical fibres; and
   (ii) a detector configured to detect radiation which is backscattered or reflected from both said first and second optic fibres.

22. An apparatus as claimed in claim 18 wherein said at least one geophone is integrated into the first optical fibre and wherein the fibre optic interrogator comprises at least one of:
   (i) an optical source configured to interrogate both said first optical fibre to provide distributed acoustic sensing and interrogate said at least one geophone;
   (ii) a detector configured to detect radiation which is backscattered from said first optic fibre and reflected from said fibre optic geophone.

23. An apparatus as claimed in claim 22 comprising a first optical fibre coupled to said fibre optic interrogator wherein said first optical fibre comprises at least one geophone.

24. The distributed acoustic sensor apparatus as claimed in claim 17 wherein the radiation backscattered from with said first optical fibre which is analysed by the fibre optic interrogator to determine a measurement signal for a plurality of discrete longitudinal sensing portions of said first optical fibre is radiation which is Rayleigh backscattered.

* * * * *